United States Patent [19]
Kourimsky

[11] Patent Number: 5,716,243
[45] Date of Patent: Feb. 10, 1998

[54] AUTOMOTIVE BATTERY CONNECTOR ASSEMBLY

[75] Inventor: Fritz Josef Alois Kourimsky, Bensheim, Germany

[73] Assignee: The Whitaker Corporation, Wilmington, Del.

[21] Appl. No.: 626,869

[22] Filed: Apr. 3, 1996

[30] Foreign Application Priority Data

Apr. 25, 1995 [GB] United Kingdom ............. 9508377
Jun. 13, 1995 [GB] United Kingdom ............. 9511974

[51] Int. Cl.$^6$ ........................................ H01R 4/50
[52] U.S. Cl. ............................ 439/773; 439/761
[58] Field of Search ....................... 439/770, 773, 439/761

[56] References Cited

U.S. PATENT DOCUMENTS

| | | | |
|---|---|---|---|
| 5,024,619 | 6/1991 | Caraballo | 439/773 |
| 5,445,907 | 8/1995 | Ito et al. | 439/770 |
| 5,588,883 | 12/1996 | Hattori | 439/761 |

FOREIGN PATENT DOCUMENTS

| | | | |
|---|---|---|---|
| 25 14 977 | 10/1976 | European Pat. Off. | F42D 1/00 |
| 44 13 847 | 11/1994 | European Pat. Off. | B60R 16/02 |
| 44 30 284 | 6/1995 | European Pat. Off. | B60R 16/02 |

*Primary Examiner*—Neil Abrams
*Assistant Examiner*—T. C. Patel

[57] ABSTRACT

An automotive battery connection assembly comprises terminals for automated connection to battery posts, and a housing with plus and minus pole circuitry mounted therein. The terminal comprises a contact section and a rotatable spring element that has tabs that cam against the periphery of the contact section. Rotation of the spring element thus clamps the battery post between the spring element and the contact section. The latter design enables robotic assembly of the battery terminals to battery posts, for example by means of a tool having pins that engage in slots of the spring element. Within the housing, a linear actuation motor drives a bridge element between tabs of the plus and minus pole circuits respectively for short circuiting the battery in the occurrence of an accident. The short circuiting blows the high current fuse thereby disconnecting power supply to most devices of the automobile. The latter is to prevent occurrence of electrical fires.

5 Claims, 3 Drawing Sheets

5,716,243

AUTOMOTIVE BATTERY CONNECTOR ASSEMBLY

BACKGROUND OF THE INVENTION

1. Field of the Invention

This invention relates to a connector assembly for an automotive battery.

2. Description of the Prior Art

Automotive battery terminals typically comprise a conical contact section for mounting to a conical battery post terminal, and having a clamping mechanism (e.g. a bolt and thread) for tightening the contact section to the battery terminal, the terminal further comprising a conductor connection section. Certain terminals are cast, and others are stamped and formed from sheet metal. Stamped and formed terminals often comprise a crimpable connection section for crimping to a large power supply cable that leads to the relay box where power is then distributed to the various devices in the automobile. Some battery terminals allow connection of more than one cable such that some of the power distribution occurs at the battery terminal. It is also increasingly common to incorporate a fuse in the power line to protect the battery from short circuiting.

Even though some batteries are fused, in the case of an accident, electrical currents that are not sufficiently high to blow the battery fuse may nevertheless ignite fires. It would therefore be desirable to disconnect all power supply in the event of an accident.

Furthermore, it would be desirable to provide more power distribution means at the battery, while nevertheless provide a relatively cost-effective battery connection assembly. In order to reduce costs, one of the important factors in the automotive industry is to reduce the number of manual assembly operations and time i.e. automate as far as possible assembly of automotive components.

It would therefore be desirable to provide a battery connection assembly that can be reliably, automatically assembled to a battery, and that ensures good electrical contact therewith. Furthermore, it would also be desirable to provide a battery connection assembly incorporating a battery protection fuse and a means for disconnecting electrical power in the event of an accident.

SUMMARY OF THE INVENTION

It is an object of this invention to provide a battery connection assembly adapted for reliable automatic assembly to an automotive battery.

It is an object of this invention to provide a battery connection assembly for rapid automatic assembly to a battery, that provides good mechanical and electrical connection to automotive battery terminals.

It is an object of this invention to provide a battery connection assembly incorporating effective and reliable electrical short circuit safety feature.

It is a further object of this invention to provide an automotive battery connection assembly that is relatively cost-effective to manufacture and assemble to a battery, and that provides a number of connection points for distribution of power at the battery.

Objects of this invention have been achieved by providing a battery connection assembly comprising a terminal for connection to a battery post, the terminal having a first conductive section comprising a wall surrounding a cavity for receiving the battery post therein, the terminal further comprising a second spring element rotatably mounted to the first section and having a cutout for receiving the battery post therethrough, the second element being rotatably mounted to the first section, each of the first and second elements having complementary camming surfaces such that when rotated with respect to each other, their respective battery post receiving cutouts are biased in opposing directions for clamping the battery post therebetween.

Other objects of this invention have been achieved by providing a battery connection assembly comprising an actuator having a conductive bridge positioned between a terminal section connected to the negative pole of the battery, and a terminal section connected to the positive pole of the battery, the bridge being disconnected from these terminals during normal operation of the vehicle, whereby the bridge is movable into contact with the terminals for short circuiting the battery by actuation of the actuator under certain abnormal conditions, for blowing a battery fuse to disconnect battery power supply.

DETAILED DESCRIPTION OF THE PREFERRED EMBODIMENT

Figure 1:
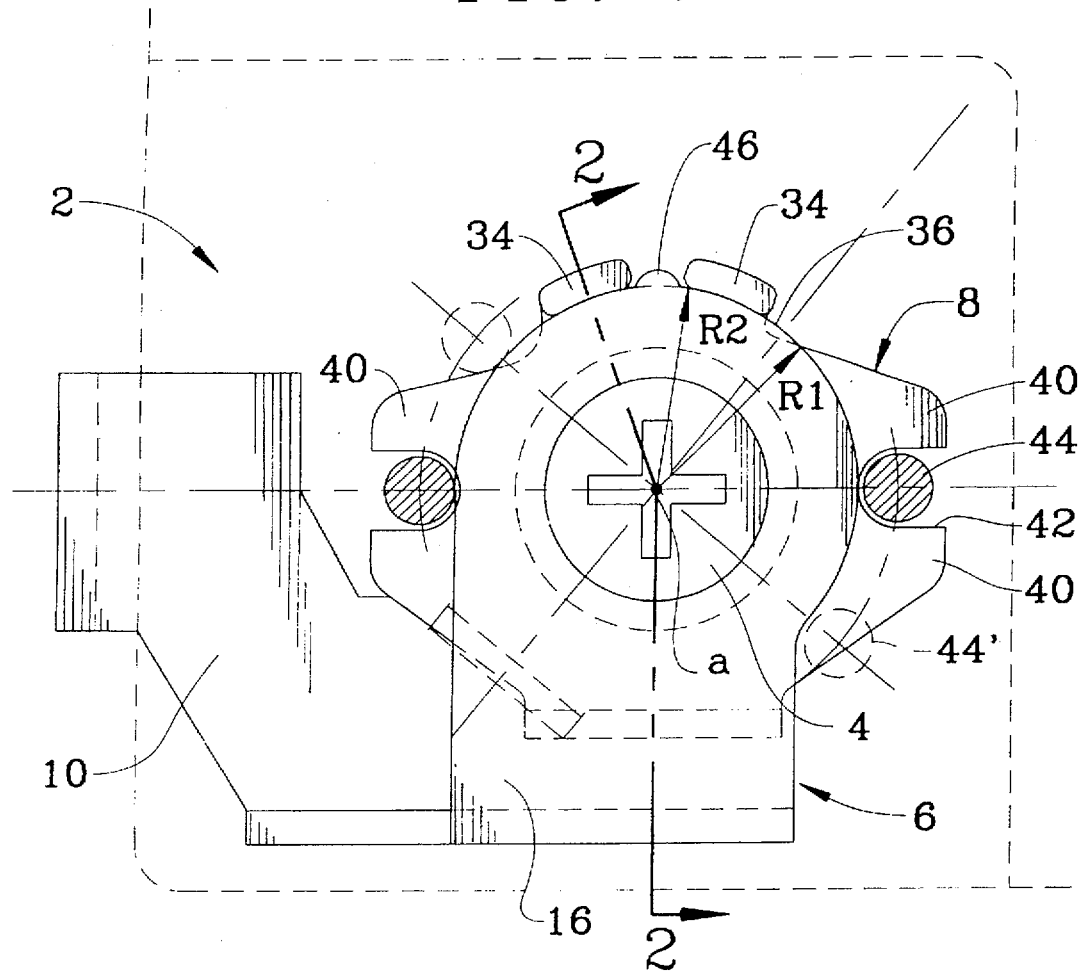
FIG. 1 is a top view of a terminal of a battery connection assembly.
Figure 2:
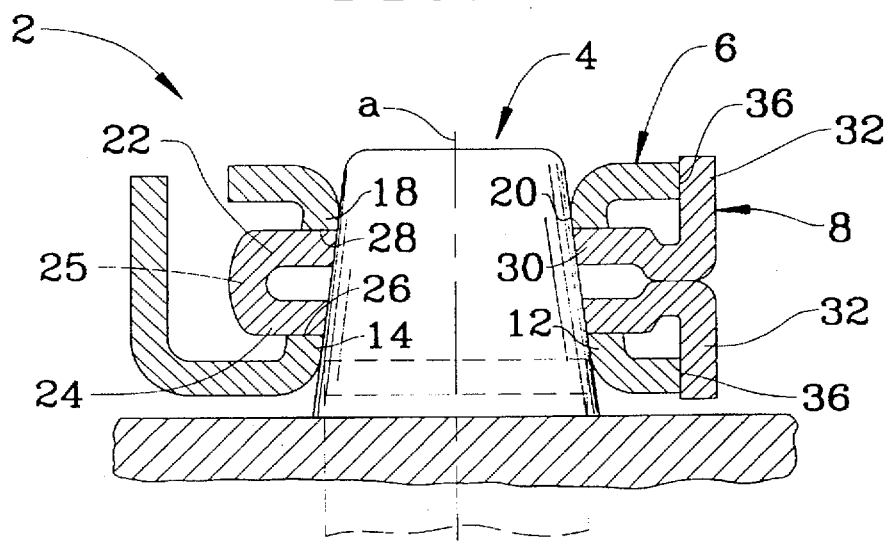
FIG. 2 is a cross-sectional view through lines 2—2 of FIG. 1.

Referring to FIGS. 1 and 2, a terminal 2 for connection to a battery post 4, comprises a contact element 6 stamped and formed from sheet metal, and a spring clamp 8 stamped and formed from a resilient sheet metal. The contact element 6 comprises a base plate 10 from which is upwardly folded a conical wall portion 12 forming a cavity 14 for receiving the battery post 4 therethrough in abutment with the conical wall portion 12. A top wall 16 is folded up from the base wall 10 over the battery post receiving cavity 14, the top wall 16 being substantially parallel to the base wall 10 and having a conical wall portion 18 downwardly bent therefrom in alignment with the wall portion 12 extending from the base wall 10. The top wall conical portion 18 thus forms a cavity 20 for receiving the battery post 4 therethrough and thereagainst.

The spring clamp 8 comprises two substantially planar base portions 22,24 attached together via a U-bend 25, the base portions 22,24 being positioned between the conical wall portions 14 and 18 of the contact section 6, the base portions being in abutment with ends 26,28 respectively of the wall portions 14,18 such that the spring element is axially retained to the contact section, where the axial direction is defined by the axis of the battery post 4. The spring element base plates 22,24 comprise a conical cutout 30 for receiving the battery post 4 therethrough, the cutout 30 being substantially in alignment with the conical cavities 12,20 of the contact wall portions. The spring element 8 further comprises camming portions 32 in the shape of a pair of tabs 34 folded upwardly and downwardly respectively from the base portions 22,24 and engageable against camming edges 36 along peripheries of the top and bottom walls 16,10. The camming edges 36 of the top and bottom walls have arcuate shapes of increasing radius (R1 to R2) from the axis a of the battery post 4, in the anti-clockwise direction when looking at FIG. 1.

The spring clamp 8 is rotatably mounted about the axis a with respect to the contact section 6. In order to effectuate rotation of the spring clamp 8, the base portions 22,24 comprise outwardly extending extensions 40 on opposing sides of the cavity 30, the extensions 40 having a cutout 42 for receiving pins 44 of a tool for assembling the battery terminal 2 to the battery post 4. Engagement of the pins 44 in the groove 42 thus enables the tool to rotate the spring clamp 8 about the axis a, from a disconnected position as illustrated in this embodiment by the dotted line 44', to a connected position 44.

To connect the battery terminal 2 to the battery post 4, the spring clamp 8 is positioned in the disconnected position, and the terminal is positioned over the battery post 4 which is received in the cavities 14,30,20 until the battery post is seated against the conical surfaces of these cavities. The tool pins 44 then rotate the spring clamp 8 (in this embodiment by approximately 45° in the anti-clockwise direction) to the connected position, whereby the spring clamp camming tabs 34 cam along the camming edge 36 of the contact section. Due to the increasing radius from R1 to R2, the spring clamp is biased in a direction orthogonal to the axis a, in opposition to the contact section 6 thereby clamping the battery post 4 between edges of the spring clamp cutout 30 and the tapered wall portions 12,18 on an opposite side of the terminal. A protrusion 46 in the connected position of the camming edge 36 is positioned between the tabs 34 in order to secure the spring clamp 8 in the connected position.

Fully automated assembly of the terminal 2 to a battery post 4 is thus enabled, in a simple and reliable manner due to the axial access of an assembly tool, axial positioning of the terminal over the battery post and a simple rotational movement for mechanical and electrical connection of the terminal to the battery post. The tool can then be easily removed by axial disengagement of the pins 44 with the terminal.

Figure 3:
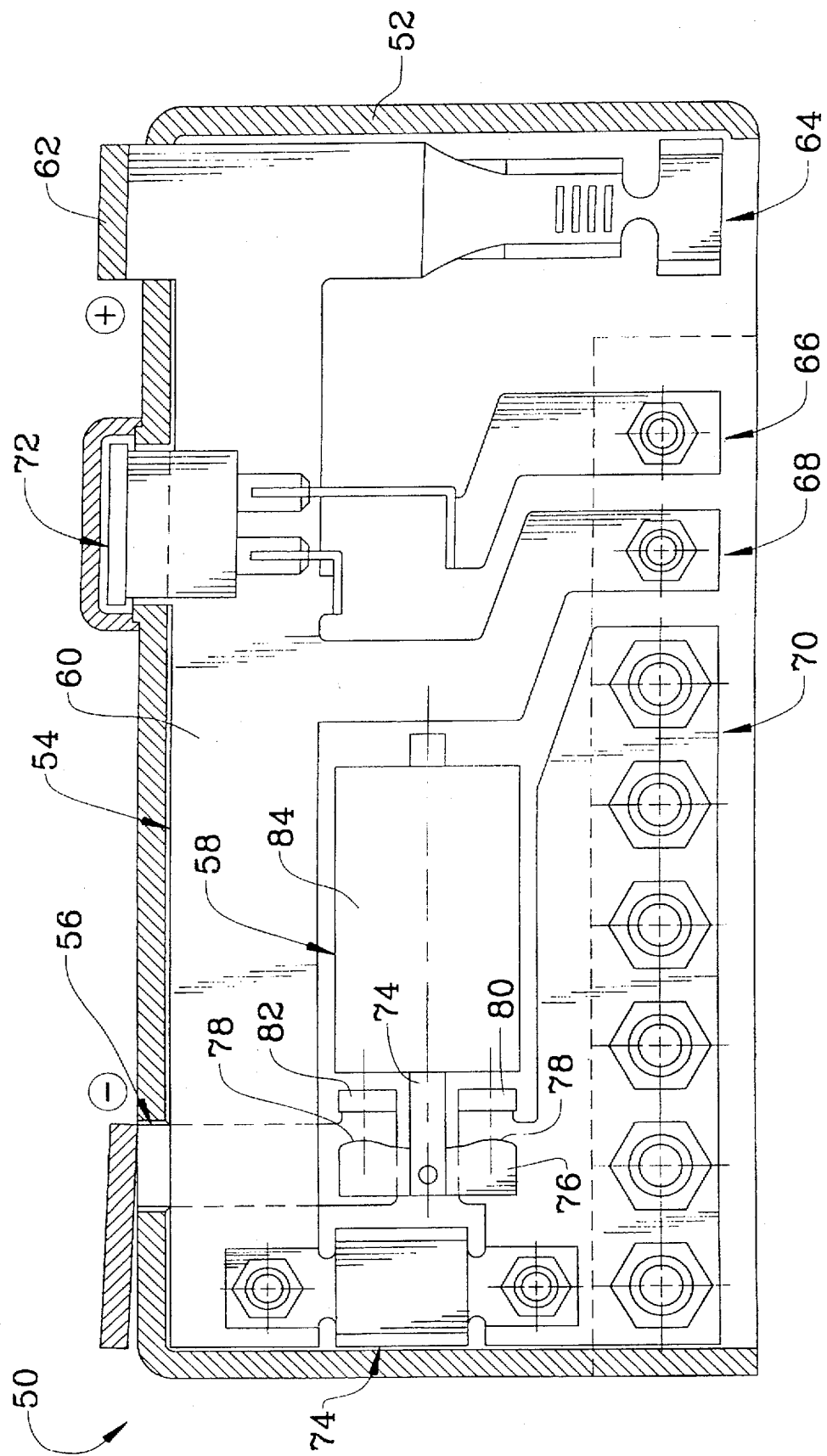
FIG. 3 is a plan cross-sectional view of a battery connection assembly.

Referring now to FIG. 3, a battery connection assembly 50 comprises an insulative housing 52, a plus pole distribution circuit 54, a minus pole circuit 56, and a short circuit actuator mechanism 58. The plus pole circuit comprises a distribution base plate 60 stamped and formed from sheet metal and having a contact section 62 integral with the base plate 10 of the terminal 2 shown in FIGS. 1 and 2, and a plurality of connection sections 64,66,68,70 for connection to conductors supplying power to electrical devices of an automobile.

One of the connection sections 64 is for crimping to a power supply conductor leading to a relay box, another connection section 66 interconnected to the base section 60 via a fuse 72 is for supplying power to a cooling fan, for example. Some devices are thus supplied directly from the battery without going through the relay box. In certain cases some devices placed close to the battery are more optimally connected directly to the battery thereby reducing harness cost and complication. Yet another connection end 68 is connected directly to the base plate 60 for connection of safety devices such as the warning blinkers or airbag etc. Further connection sections 70 are interconnected to the base section 60 via a high current fuse 74, the connection section 74 supplying power to most of the electrical devices in the automobile. The high current fuse 74 thus prevents damage from short circuiting of the battery for the major electrical functions of the automobile. Connection sections 66,68 and 70 are provided in this embodiment with threaded connections for bolting conductors terminated with ring-tongue terminals thereto, for a secure and good electrical connection. Other connection means could however also be considered.

The short circuit actuator 58 comprises a movable rod 74 and a bridge element 76 mounted with slight pivotable movement to an end of the rod 74 to form a T-shape with the rod. The bridge element 76 has on either end arcuate contact surfaces 78 opposite and spaced apart from tabs 80,82 of the plus and minus pole circuits 54,56 respectively. The rod 74 is connected to a linear electric motor 84 that can be actuated to move the contact surfaces 78 of the bridge element 76 into contact with the tabs 80 and 82, thereby short circuiting the plus and minus poles of the battery. Actuation of the linear electric motor 84 could occur, for example, upon occurrence of an accident detected by explosion of airbags. In normal operational state, the rod 74 would be biased by means of a spring, for example, so that a safe gap between the contact surfaces 78 and the tabs 80,82 is maintained. The slight pivotable movement of the bridge 76 ensures that both contact surfaces 78 are fully biased against their respective tabs 80,82 for good electrical contact therebetween. The short circuiting of the battery terminals thus causes the fuse 74 to blow, thereby cutting power supply from the connection sections 70 to devices in the automobile. The latter thereby ensures cutting of power supply to most of the automobile electrical devices upon occurrence of an accident, so as to prevent any short circuiting of these devices or their harnesses to cause an outbreak of fire.

Advantageously therefore, the provision of a circuit distributing electrical connections 64 to 70, and incorporation of safety devices 58,74 within a housing 52, and further provision of the terminals 2 extending out of the housing 52, enables easy and rapid assembly of the battery connection assembly 50 to an automotive battery, whilst nevertheless integrating safety features and a plurality of different connection possibilities to the battery. The latter not only reduces assembly costs, but also increases flexibility, safety and provides the possibility of having a more optimal harness layout as some of the electrical devices in the motor, for example, can be fed from the battery power connections rather than through the relay box.

Figure 4:
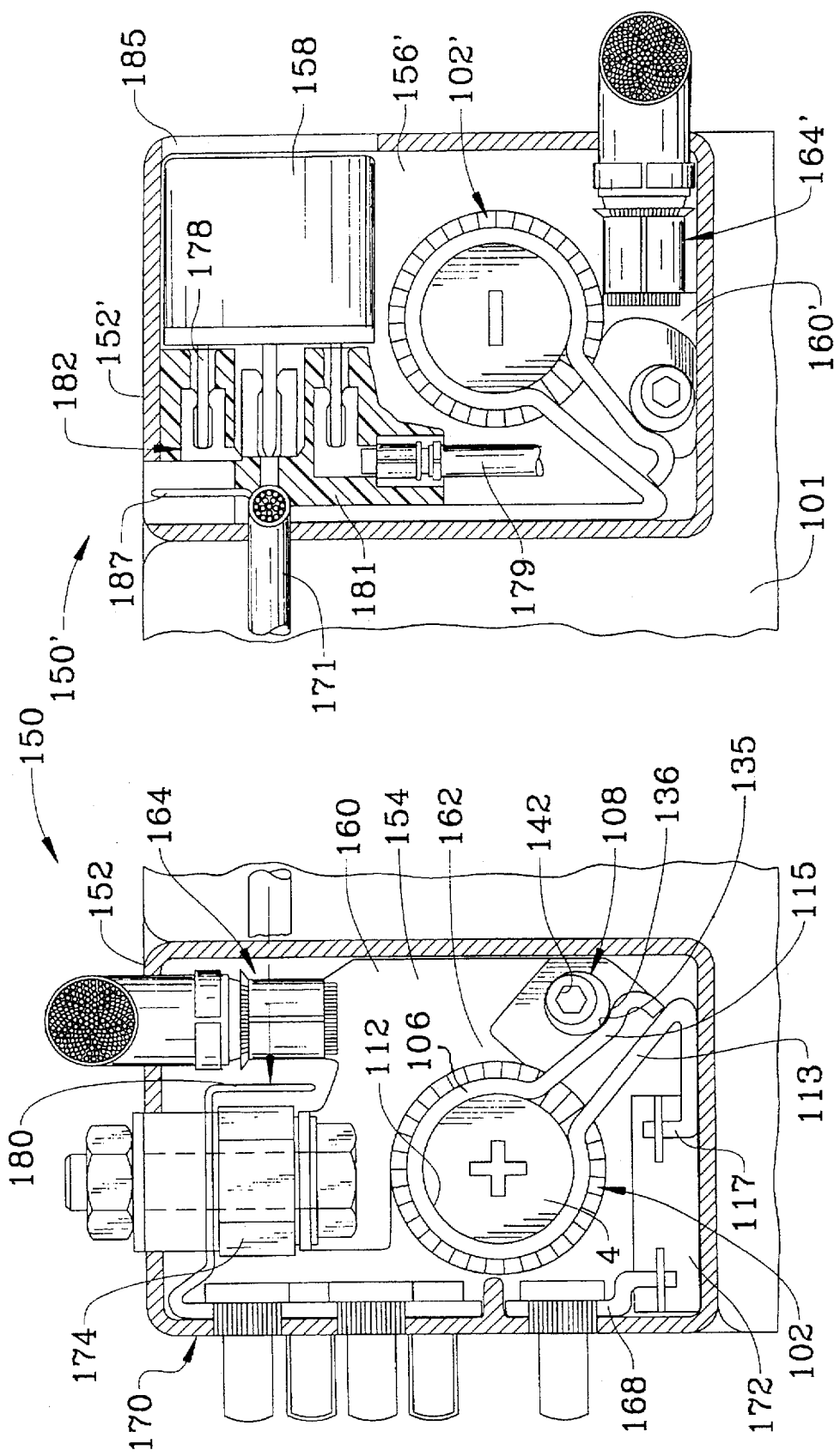
FIG. 4 is a top view of another embodiment of this invention.

Referring to FIG. 4, another embodiment of a battery connection assembly 150,150' is shown comprising separate insulative housings 152,152' for housing a plus pole distribution circuit 154, and then minus pole distribution circuit 156 as separate units. A short circuit actuator mechanism 158 that is in particular a relay, is positioned in the minus pole circuit housing. The plus pole circuit comprises a distribution base plate 160 stamped and formed from sheet metal and having a contact section 162 integral with a terminal 102 for connection to the battery post 4. The terminal 102 comprises a contact element 106 folded into a conical wall portion 112 for contact against the conical battery post. Extensions 113,115 extend from the conical section 112, one of the extensions 113 extending to a contact end 117, the other extension 115 providing a camming surface 135 for engagement against a camming element 108 that is rotatably mounted to the base plate 160. The camming element 108 comprises a recess 142 extending along its pivot axis (i.e. substantially parallel to the axis of the battery post 4), for receiving a tool to rotate the element 108. A camming surface 136 of the camming element 108 surrounds the pivot axis and extends further outwards from the pivot axis along a section thereof for biasing the extension 115 towards the other extension 113. The latter thereby enables clamping of the conical portion 112 about the battery post 4. An automated robot can easily position the connection assembly 150 over the battery post, and subsequently rotate the camming element 108 to tighten the terminal to the battery post. Automated assembly is thus simple and rapid.

The base plate 160 is also integral with a crimp connection 164 for connection to the vehicle starter motor. A high current fuse 174 is clamped by a bolt between the base portion 160 and a connection section 170 for distributing the power to various electrical devices of the automobile. The connection section 170 is traversed by bolts for the mechanical and electrical connection to conductors. The connection section 170 further comprises a contact 180 for interconnection via a cable (or other conductor) 171 to a contact 178 of the relay 158. The relay 158 is further interconnected to a negative pole terminal 102' and an ignition cable 179. The ignition cable 179 is connected, for example, to the airbag, and the ignition of the airbag switches the relay 158 such that the plus and minus poles are short circuited (via the cable 171) to blow the fuse 174. In the advent of an accident, power supply to various components in the vehicle via the connection system 170 is thus disconnected.

The battery terminal extension 113 is interconnected via a fuse 172 to a further connection section 168 for supplying power to the radiator ventilator of the motor.

The minus pole battery terminal 102' is constructed in a similar manner to the plus pole battery terminal 102, and will not be described in any further detail.

A further insulative housing 181 is provided within the minus pole battery assembly for housing contacts 182 that plug onto the tabs 178 of the relay 158. The relay 158 can be thus removably plugged to the connection assembly through a hole 185 in the housing 152. Connection to the electrical circuit of the vehicle is via a cable crimped to the connection section 164' integral with the stamped and formed base 160'. Further connection sections such as tabs 187 can be stamped from the base 160' for providing pluggable or disconnectable electrical connections to the minus pole.

Both the minus pole and plus pole connection assemblies 150,150' are compact individual units housed in insulative housings 152,152' and are separately mountable to the plus and minus poles respectively of an automotive battery of an automotive battery 101 in an automated manner.

I/we claim:

1. An automotive battery connection assembly comprising a terminal for electrical and mechanical connection to a battery post, and a connection section for electrical connection to conductors of an automobile, the terminal comprising a contact section having a conical wall portion forming a cavity for receiving the battery post therein, characterized in that the terminal further comprises a spring clamp rotatably mounted adjacent the conical wall portion and having a base portion with a cutout for receiving the battery post therethrough, the cutout having an edge for clamping towards the battery post, the spring clamp further comprising a camming portion in resilient engagement against a camming surface of the contact section, the camming surface having an arcuate profile of increasing distance with respect to a center axis of the battery post such that upon rotation of the spring clamp from a disconnected position to a connected position, the spring clamp and contact sections are biased apart from each other in a direction substantially perpendicular to the center axis thereby clamping the battery post between the spring clamp and contact section.

2. The battery connection assembly of claim 1 characterized in that the spring clamp is positioned between upper and lower conical wall portions that extend from top and base walls respectively.

3. The battery connection assembly of claim 1 characterized in that the spring clamp camming portion comprises resilient tabs projecting in an axial direction, defined by the direction of the battery post center axis, and in abutment against peripheral edges of the contact section base and top walls that form the camming surface.

4. The battery connection assembly of claim 1 characterized in that the spring clamp comprises slots formed in extensions on opposing sides of the base portion for axially receiving pins of a tool therein, for rotating the spring clamp.

5. An automotive battery connection assembly comprising a terminal for electrical and mechanical connection to a battery post, and a connection section for electrical connection to conductors of an automobile, the terminal comprising a contact section having a conical wall portion forming a cavity for receiving the battery post therein, characterized in that the terminal further comprises a camming element rotatably mounted adjacent an extension extending from the conical wall portion, the camming element comprising a camming surface in engagement against a camming surface of the extension, the camming element camming surface having an arcuate profile of increasing distance with respect to an axis of rotation of the camming element such that upon rotation thereof from a disconnected position to a connected position, the camming element biases the extension thereby pulling the coaxial wall portion tightly around the battery post to clamp thereagainst.

* * * * *